Figure 1:
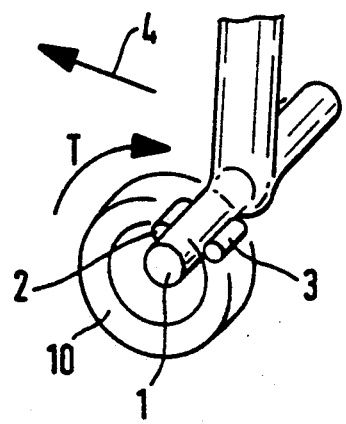

United States Patent [19]

Patzig

[11] Patent Number: 5,239,137
[45] Date of Patent: Aug. 24, 1993

[54] METHOD FOR CALIBRATING SENSORS ARRANGED IN PAIRS ON LOADED STRUCTURAL PARTS

[75] Inventor: Hans N. Patzig, Bad Homburg, Fed. Rep. of Germany

[73] Assignee: VDO Adolf Schindling AG, Frankfurt am Main, Fed. Rep. of Germany

[21] Appl. No.: 854,464

[22] Filed: Mar. 19, 1992

[30] Foreign Application Priority Data

Mar. 27, 1991 [DE] Fed. Rep. of Germany ........ 4110063

[51] Int. Cl.⁵ .................... G01G 19/08; G01G 9/00
[52] U.S. Cl. ........................ 177/136; 177/1; 177/50; 177/211
[58] Field of Search .............. 177/1, 136, 211, 50; 73/1 B, 1 C, 862, 628

[56] References Cited

U.S. PATENT DOCUMENTS

| | | | |
|---|---|---|---|
| 2,443,045 | 6/1948 | Magruder et al. | 177/136 |
| 2,453,607 | 11/1948 | Wardle et al. | 177/136 |
| 2,615,330 | 10/1952 | Blackman et al. | 177/136 |
| 2,716,547 | 8/1955 | Thurston | 177/1 |
| 3,273,382 | 9/1966 | Fonash | 177/136 |
| 3,426,586 | 2/1969 | Kadlec | 177/136 |
| 3,499,500 | 3/1970 | Harding | 177/136 |
| 4,269,070 | 5/1981 | Nelson et al. | 73/779 |
| 4,836,308 | 6/1989 | Davis et al. | 73/1 B |
| 4,909,338 | 3/1990 | Vitunic et al. | 73/1 B |

*Primary Examiner*—Benjamin R. Fuller
*Assistant Examiner*—R. Gibson
*Attorney, Agent, or Firm*—Martin A. Farber

[57] ABSTRACT

For the calibration of an electronic measurement system with sensors which are arranged in pairs on structural parts of an airplane undercarriage which are loaded transverse to the lengthwise direction and which give off measurement signals which correspond to the vertical displacement between two sensor attachment points which are staggered from each other in the lengthwise direction of the structural parts, the pair of sensors which form a measurement point in each case being arranged approximately in the horizontal central plane of the structural part at positions opposite each other on the outside, a method is proposed in which a separate scaling factor is determined for each sensor of the pair of sensors. For this purpose, the measurement signals and weights are preferably determined for at least two conditions of loading of the airplane which are as far apart as possible and, furthermore, in connection with at least two different torsional conditions of the loaded structural part.

9 Claims, 3 Drawing Sheets

METHOD FOR CALIBRATING SENSORS ARRANGED IN PAIRS ON LOADED STRUCTURAL PARTS

The present invention relates to a method of calibrating an electronic measuring system having sensors which are arranged in pairs on structural parts of an airplane undercarriage loaded transverse to the longitudinal direction, which give off measurement signals which correspond to the vertical shift between two sensor attachment places spaced apart from each other in the longitudinal direction of the structural part, the pairs of sensors which form in each case a measurement point being arranged approximately in the horizontal center plane of the structural part at outside positions opposite each other.

For the safety and economy of airplane operation it is of great importance to ascertain the weight and position of the center of gravity of an aircraft accurately, i.e. with an error of less than 1%. Since it is not possible, or would at least be very difficult, to place airplanes on a scale before each takeoff, it has already been proposed to obtain measurement values which permit dependable conclusions as to the corresponding load from the elastic deformation of structural parts of the aircraft undercarriage which are loaded transverse to the longitudinal length thereof. For this purpose, sensors (for instance in accordance with U.S. Pat. No. 4,269,070) are arranged in pairs on a structural part, loaded transverse to the longitudinal length, of an aircraft undercarriage (in the case of two-wheel undercarriages therefore on each half axle and in the case of a four-wheel undercarriage on the front and rear half pivot arms) in such a manner that the pairs of sensors, each of which forms a measurement point, are arranged approximately in the horizontal central plane of the structural part at outside positions opposite each other. The vertical displacement between two sensor attachment points spaced from each other in the longitudinal direction of the structural part is measured.

This arrangement is based on the idea that a torsional load superimposed on the load resulting from the weight can be readily compensated for since the torsion causes an equal but opposite measurement error in the two sensors, which error will not appear if the load is calculated in each case from the sum of the measured values of a pair of sensors. The portion of the total weight of the aircraft acting on a half axle or on a half pivot arm is obtained in this case from the formula $$W = (C_T + C_I) S + A$$

in which:
W = portion of weight, axle weight
C = Measured value, digitalized in the form of "counts"
S = Calibration factor for a pair of sensors
A = Offset The linear relationship between load (W) and changes in shape ($C_O + C_I$) expressed by the formula can be taken as basis since the structural parts of the aircraft undercarriage are so designed that only elastic deformations occur under loads caused by operation, these deformations being in all cases linearly proportional to the forces acting.

The sensors have also been calibrated in accordance with the above formula. For two different states of load (tanks empty—full) pairs of values ($W_1/(C_{O1} + C_{I1})$ and $W_2/(C_{O2} + C_{I2})$) were determined and the corresponding calibration factor S and the offset A for each pair of sensors calculated. In this connection, however, it was found that the weight of the aircraft or the portions of the weight devolving on the individual measurement points cannot be determined with the required accuracy (error less than 1%).

The error in the output signals $C_O$ and $C_I$ of a pair of sensors produced by torsion is namely only completely compensated for upon addition of the two signals if the output signals of both sensors actually contain equal portions of error. However, this cannot be assumed since a) the torsional rigidity of the loaded structural part within the controlling regions of the two sensors of a measurement point may be different as a result of manufacturing tolerances;

b) the distances of the sensors from the area centroid of the structural part may be different; and c) the signals of the sensors of a measurement point may differ from each other due to different sensitivity with otherwise identical loading.

The object thus results of so further developing the known method of calibration that said influences can be compensated for and that a method of measurement is finally available by which the weight of the aircraft can be ascertained with an error of less than 1%.

In order to achieve this, it is proposed that a separate scaling factor be determined for each sensor. As part of the method of calibration, an offset is furthermore to be obtained for each pair of sensors. The scaling factors ($S_O$, $S_I$) and the offset (A) are determined from the individual measurement signals ($C_O$, $C_I$) of a pair of sensors and the weight (W) acting on the corresponding structural part, using the formula $$W = S_O \times C_O + S_I \times C_O + A.$$

In this connection it is advantageous to determine the measurement signals and weights over at least two states of loading of the aircraft which are as far apart as possible, for instance with empty tanks and full tanks. Furthermore, the measurement signals and weights for at least one state of loading should furthermore be ascertained in at least two different torsional conditions of the loaded structural parts. Torsion of the half axles of a two-wheel undercarriage can be produced by the locking of the brakes of the wheels standing on an ascending or descending ramp. In the case of a four-wheel undercarriage, torsion of the pivot arms is produced by placing a plate under one of the four wheels, preferably by placing plates under two wheels which are diagonal to each other.

If a balance is available with which the individual wheel weights ($W_O$, $W_I$) can be measured, then the weight and torsion portions ($S_W$, $S_T$ of the calibration factors ($S_O$, $S_I$) and the offsets ($A_O$, $A_I$) can be calculated by the use of the following formulas:

$$W_O = \frac{C_O + C_I}{2} \times S_{WO} + \frac{C_O - C_I}{2} \times S_{TO} + A_O$$

$$W_I = \frac{C_O + C_I}{2} \times S_{WI} + \frac{C_I - C_O}{2} \times S_{TI} + A_I$$

The weight and torsion portions ($S_W$, $S_T$) correspond to the reciprocals of the weight and torsion rigidities respectively of the structural part in the region of the measurement point. The following relationship exists between them and the scaling factors of the individual sectors:

$$S_O = 0.5 (S_{WO} + S_{WI} + S_{TO} - S_{TI})$$

$$S_I = 0.5 (S_{WI} + S_{WO} + S_{TI} - S_{TO})$$

Further details of the invention will be explained with reference to FIGS. 1 to 9.

Figure 2:
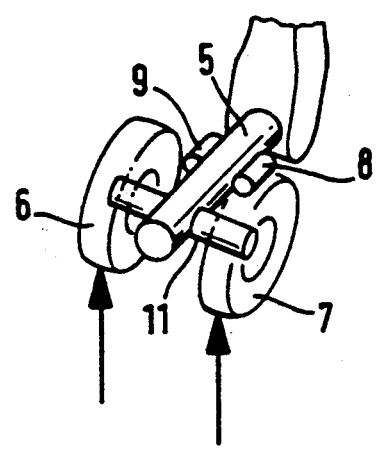
Figure 3:
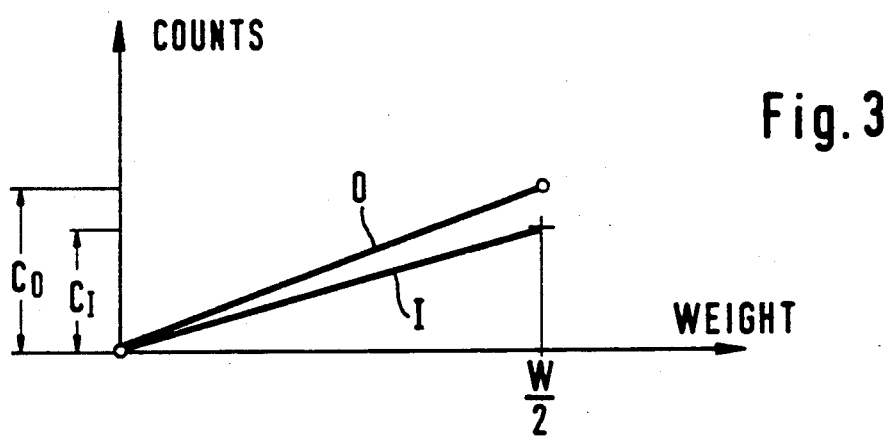
Figure 4:
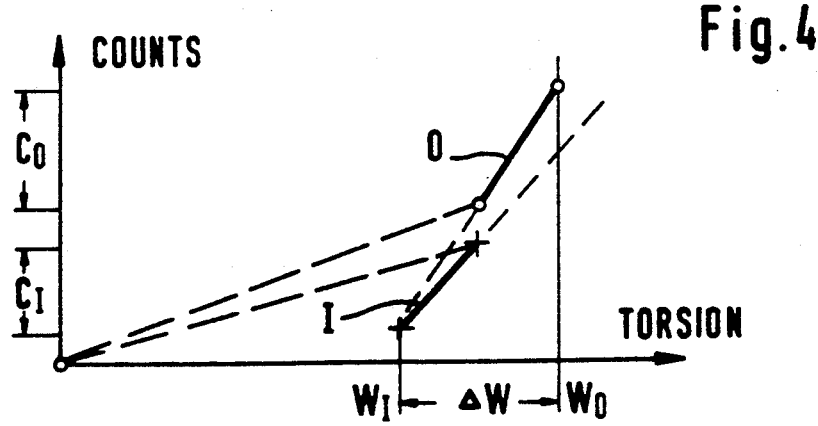
Figure 5:
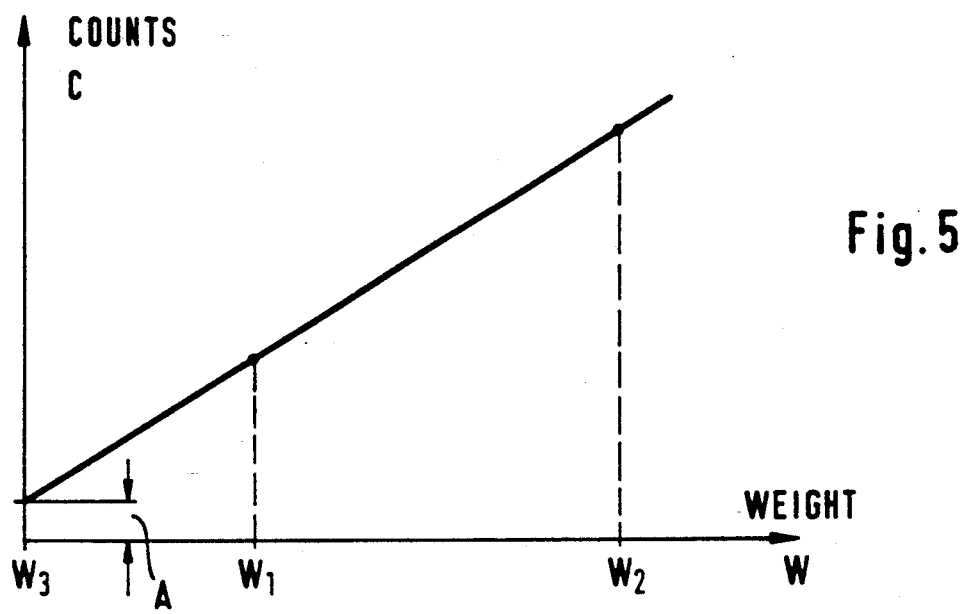

In the drawing:

FIG. 1 shows a measurement point on a half axle of an undercarriage, as seen in a perspective view from above, FIG. 2 shows a measurement point on a half pivot arm of an undercarriage, also in perspective seen from above, FIG. 3 shows the dependence of the sensor output values on the weight which acts on a measurement point, FIG. 4 shows the dependence of the sensor output values on the torsion which acts on a measurement point, FIG. 5 shows the dependence of the sensor output values on the weight when there is an offset of the weight curve.

Figure 6:
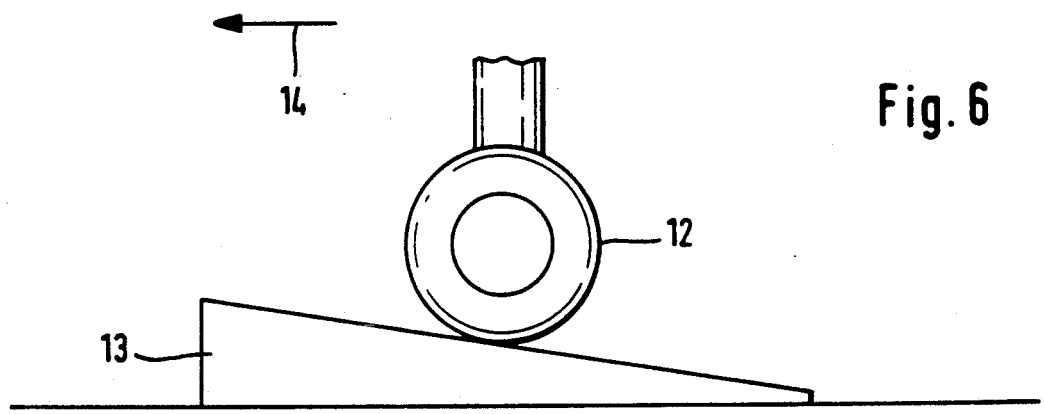
Figure 7:
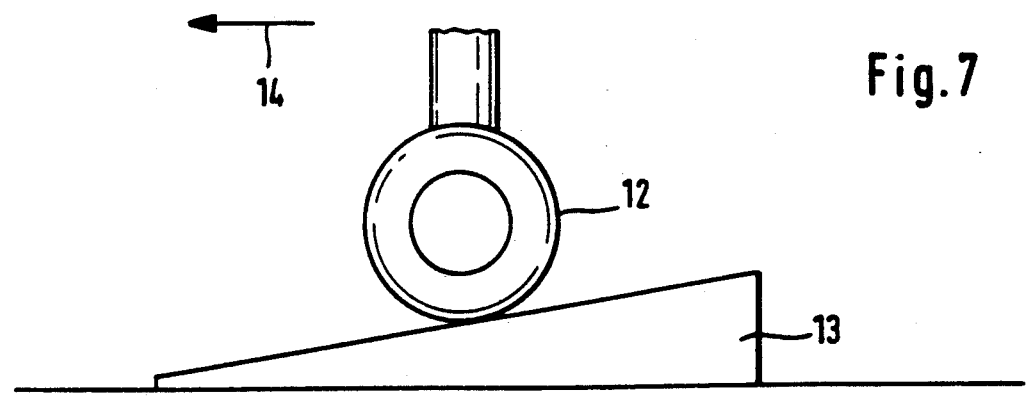
Figure 8A:
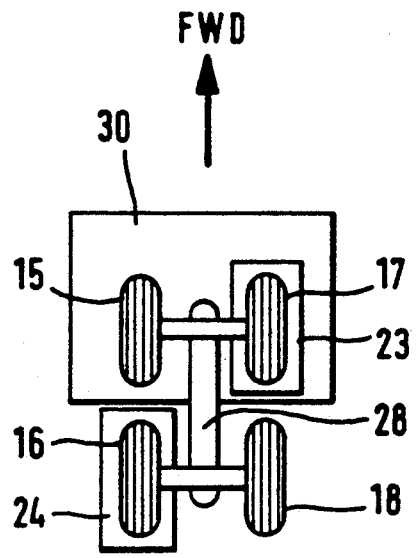
Figure 8B:
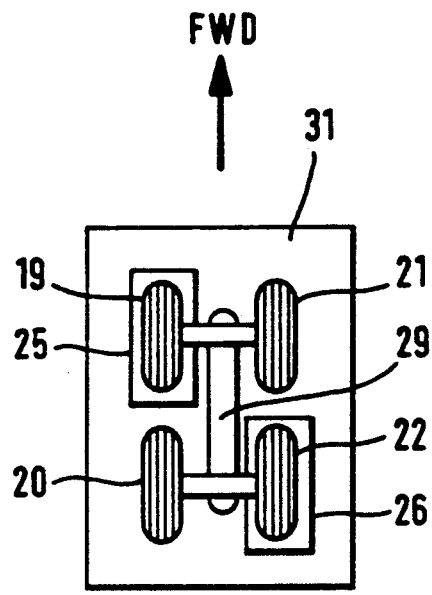
Figure 9:
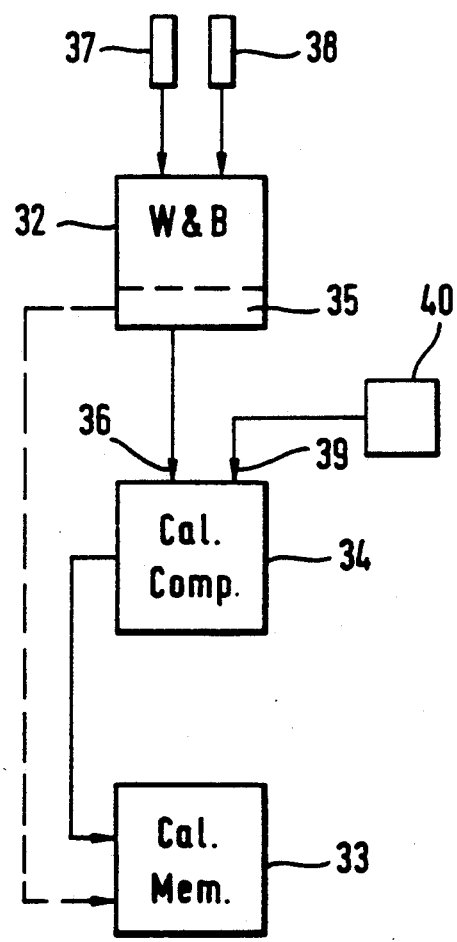

FIGS. 6 and 7 show different configurations for the loading of the undercarriage, seen in a side view, FIGS. 8a & 8b shows a configuration of the loading of the undercarriage in the case of four-wheel undercarriages and the weighing thereof, and FIG. 9 is a block diagram of a data processor for the calibration.

In FIG. 1, a measurement point is shown on a half axle 1, two inductive sensors 2 and 3 being arranged at positions of the half axle which are opposite each other on the outside. Specifically, for the attachment on the extension, not shown in the drawing, developed on each axle serves for the fastening of one sensor half. In the forward direction 4 of the undercarriage the sensor 2 is the front sensor and the sensor 3 the rear sensor.

FIG. 2 shows a measurement point on a half pivot arm 5 on which two wheels 6 and 7 are mounted. Two sensors 8 and 9 are in this case fastened at positions of the half pivot arm which are opposite each other on the outside. In the example shown in FIG. 2, the sensor 8 can represent an inner sensor and the sensor 9 an outer sensor.

The wheel weight of a wheel 10 acts on the two sensors 2 and 3 of the measurement point shown in FIG. 1, and the weight of an axle 11 on the half pivot arm acts on the two sensors 8 and 9 of the measurement point in FIG. 2, namely in each case as shear deflection and flexural deflection in the same direction.

In the half axle shown in FIG. 1, a torsion T is produced by bearing friction and/or brake action. At the measurement point shown in FIG. 2, a twisting of the measurement point can be active due to irregularities in the ground or differences in tire pressure or profile, since the axle weight, as indicated by the two straight arrows which are not provided with reference numerals, divides itself nonuniformly over the wheels 6 and 7. In each of the two cases, a twist deflection is superimposed on the weight deflection of the sensors. Since the twist deflection is in opposite direction for the two sensors of a measurement point, the twist deflection is, as desired, compensated for in the ideal case if the output values of the sensors, which values are formed as counting pulses by electric switch means (not shown), are added. However, this ideal case is only approximately satisfied in practice, and not only because the sensors of a measurement point have sensitivities which differ from each other. Rather, it has been found that the structure of the half axle or half pivot arm as well as the application of the sensors to the half axle and the half pivot arm can in many cases exert substantial influence on the dependence of the output values of each sensor on the weight which acts on the measurement point or on the torsion acting. These relationships are shown for the dependence on weight of the output value (counts) of the inner sensor—line I—and of the outer sensor—line O. FIG. 3 shows, in the case of the weight W/2, that the output values $C_I$ and $C_O$ are not the same, but differ from each other.

A similar relationship can result for the front sensor 2 and the rear sensor 3 of the measurement point in FIG. 1.

The inclinations of the two conversion lines—lines I and O—in FIG. 3 are therefore not necessarily the same for the two sensors of a measurement point.

It may be pointed out here that the electric deflection of one of the sensors (C) is equal to half the weight on the half axle (W/2) multiplied by the weight elasticity at this point (1/$M_W$):

$$C_O = \frac{W}{2} \times \frac{1}{m_{WO}}$$

$$C_I = \frac{W}{2} \times \frac{1}{m_{WI}}$$

The subscript O here refers to the outside or front and the subscript I to the inside or rear.

$M_W$ designates the corresponding weight stiffness.

In FIG. 4 the slopes of the straight sections I and O are the torsion scale factors or twist factors $S_T$ for the inner sector or rear sector and the outer sensor or front sensor respectively. From FIG. 4 it can be noted that these slopes may be different. In FIG. 4, the dependence of the output value of these two sensors (counts) is indicated as a function of the torsion or twisting of the measurement point. In the abscissa direction, the weights $W_I$ and $W_O$ are marked on the inner sensor and outer sensor respectively, the conversion lines I and O extending from them. The output value $C_I$ or $C_O$ of one of these two sensors is then equal to half the difference in weight on the (half) axle multiplied by the torsion elasticity at the measurement point 1/$m_T$. Thus, the relationships for the output values $C_O$ and $C_I$ are:

In the above forms, $\Delta W$ is the difference in weight or twisting of the axle and m the torsional rigidity which is measured with the outer or inner sensor.

In practice, the output values of the two sensors at a measurement point go back to the torsion-free portion of the deflection as a result of the weight plus the torsion-produced portion which occurs on the difference of the two individual-wheel weights on a half pivot arm. We then have as a whole, for the output values $C_O$ and $C_I$ of the outer sensor and inner sensor respectively:

$$C_O = \frac{\Delta W}{2} \times \frac{1}{m_{TO}}$$

$$C_I = \frac{\Delta W}{2} \times \frac{1}{m_{TI}}$$

$W_O + W_I$ is the total weight at a measurement point and $W_O - W_I$ the difference in weight at this measurement point.

The above calculations form the basis for calculating the individual wheel weights and serve for the mathematical simulating of sensor deflections. However, for the calibration of the sensors arranged on the undercarriage of an airplane scaling factors or characteristic values must be found which establish the relationship between the output values of the sensors and the count pulses and the actual weight at the measurement point respectively.

For the determination of the scaling factors of the sensors for the axial weight on a half pivot arm of a four-wheel undercarriage, we proceed from the relationship $W = C_O \times S_O + C_I \times S_I$ in which:

$C_O$ is the electrically measured deflection of an outer sensor of the measurement point.

$C_I$ is the electrically measured deflection of an inner sensor of the measurement point.

$S_O$ is a weight scaling factor of the outer sensor, and $S_I$ is a weight scaling factor of the inner sensor (offset $A = 0$).

This measurement point having two sensors can now be acted on in succession by two different weights $W_1$ and $W_2$ (for instance, tanks empty/tanks full) so that the weight scaling factors $S_O$ and $S_I$ can be calculated in accordance with the following relationships from the starting values $C_{O1}$ and $C_{I1}$ for the weight $W_1$ and $C_{O2}$ and $C_{I2}$ for the weight $W_2$:

$$S_O \times C_{O1} + S_I \times C_{I1} = W_1$$

$$S_O \times C_{O2} + S_I \times C_{I2} = W_3$$

FIG. 5 shows that the conversion curves or weight-scale factors need not necessarily pass through the zero point, but that an offset (A) can be present. The slope of the line in this case also corresponds to the weight scaling factors of the two sensors of a measurement point. FIG. 5 shows points with the results of a first and second weighing (W1, W2), as well as a third weighing (W3) through which the curves extend. For the determination of the offset, a third weighing with a different airplane weight than in the first and second weighings can be employed or the measurement results for unloaded landing gear, i.e. with airplane raised off the ground, can be used (W3=0). For the three different configurations in which the measurement point is loaded with the weights W1, W2 and W3, the following relationships occur in which A (by itself) designates the offset:

$$S_O \times C_{O1} + S_I \times C_{I1} + A = W_1$$

$$S_O \times C_{O2} + S_I \times C_{I2} + A = W_2$$

$$S_O \times C_{O3} + S_I \times C_{I3} + A = W_3$$

From this there is obtained the offset $$A = W_1 - S_O \times C_{O1} - S_I \times C_{I1}$$

Thus, from three weighings of an axle in the case of a four-wheel undercarriage or of one wheel in the case of a two-wheel undercarriage, two weight scaling factors of the two sensors of a measurement point and a corresponding axle offset can be calculated.

For the further improvement of the precision of measurement it is advisable to determine the scaling factors and offsets not only with different loads but also under different torsional conditions of the loaded structural part. Such torsional conditions can be obtained, for instance, as follows:

For a nose undercarriage,
    Wheel axle is twisted forwards
    Wheel axle is twisted backwards
For a two-wheel main undercarriage
    Standing, braked, forward on an oblique ramp
    Standing, braked backward on an oblique ramp
For a four-wheel main undercarriage (half pivot arm)
    Place a plate below the outer wheel
    Place a plate below the inner wheel In this way one obtains a large number of pairs of values $W/C_0$, $C_I$, all of which can be used for determining the scaling factors and offsets and can be evaluated by known mathematical methods. One obtains a multiply overdetermined system of linear equations from which there scaling factors and offsets can finally be derived on which neither systematic torsional errors nor static random errors can have an effect. In this way, it is then possible in practice, to determine from the output value of a pair of sensors the portion of weight of the airplane devolving on an axle in a reliable manner even when the weight is non-uniformly distributed or torsions occur, the two sensors are not at exactly the same distance from the center of the measurement point, the bore of the axle or the pivot arm is displaced with respect to the ideal center line, which has an effect on the area centroid, the sensors are of different sensitivity, and the zero point was incorrectly measured.

In the event that the calibration is to be effected with a balance which can receive the entire four-wheel undercarriage, only one common weight value for the entire undercarriage is available for two measurement points with three parameters each from each weighing. In this case, at least six different configurations must be realized in order to be able to determine the six unknowns.

FIGS. 6 to 8 show different configurations of the undercarriage loading, principles of the weighing being furthermore indicated in FIG. 8.

In FIG. 6, a wheel 12 which may belong to a two-wheel main undercarriage is moved forward on an oblique ramp 13. The forward direction or direction of flight is indicated by 14.

FIG. 7 shows a similar configuration in which, however, the wheel 12 is moved backward on the oblique ramp 13.

In FIGS. 8a & 8b there can be noted a top view of a four-wheel main undercarriage in which, in each case, four wheels 15–18 and 19–22 are arranged on a pivot arm 28 and 29, respectively. The loading of the pivot beam results from the fact that a plate 23 is placed below the front inner wheel 17 while another plate 24 is arranged below the rear outer wheel 16. Accordingly, one plate 25 lies below the front inner wheel 19 and one plate 26 is arranged below the rear outer wheel 22.

FIG. 9 shows a block diagram of a data processor for the calibration. It consists essentially therein that between a weight and center of gravity location computer 32 and a corresponding calibration memory 33, a calibration computer 34 is inserted. Instead of the calibration computer 24 an additional disk 35 can also be inserted in the weight and center of gravity position computer 32 which performs analog functions like the calibration computer in combination with the weight and center of gravity position computer 32. The connection between the disk and the calibration memory is indicated by a dashed-line. The calibration computer has an input 36 which is fed from the weight and center of gravity computer 32 with sensor data such as the output values of sensors 37 and 38 and with system data such as condition of flight and moment arms. A second input 39 of the calibration computer 34 is acted on by a keyboard 40 or, as an alternative, by a flight management computer (FMC) by which airplane data such as weight data and center of gravity position are made available. In a memory region of the calibration computer 34 there are stored a sufficiently large number of load configurations with corresponding weight and center of gravity data in order to calculate the weight calibration factors and torsion calibration factors of each sensor 37, 38 from these collected load configurations with corresponding data. These calculated parameters are stored in the calibration memory 33.

As indicated above, for the monitoring of the condition of the tire a very precise calculation of the wheel weights is necessary in order to avoid false alarms. Only certain weight distributions on the wheels of an undercarriage permit the conclusion that one of the wheels has too low an internal pressure. These weight distributions are based on the effect of the loading of each wheel of an undercarriage on the wheel arranged on the opposite side on the same support (axle).—The wheel weights can be calculated from the formulas for the sensor output values $C_O$ and $C_I$, corresponding to the straight sections in FIGS. 3 and 4 in the manner that sufficient pairs of values $C_O + C_I$ and $C_O - C_I$ for different known individual wheel weights are calculated, the measurement point being twisted for individual measurements. In this connection, one proceeds from the formulas indicated in claim 9.

I claim:

1. A method of calibrating an electronic measurement system having sensors which are arranged in pairs on structural parts of an aircraft undercarriage which are loaded transverse to a lengthwise direction and which give off measurement signals which correspond to a vertical displacement between two sensor attachment points staggered from each other in the lengthwise direction of the structural parts, the method comprising the steps of:

employing each of said sensor pairs for a single measurement point;

arranging the sensor pairs approximately in a horizontal center plane of the structural parts on outside positions of the structural parts opposite each other;

determining a separate scaling factor for each sensor of said sensor pairs;

applying scaling factors to loads measured by respective ones of the sensors to obtain scaled sensor measurements; and summing scaled sensor measurements of the sensors of a sensor pair to obtain a load measure at a measurement point.

2. A method according to claim 1, further comprising the step of obtaining an offset for each pair of sensors.

3. A method according to claim 1, further comprising the step of determining scaling factors ($S_O$, $S_I$) and an offset (A) from individual measurement signals ($C_O$, $C_I$) of a pair of sensors, and a weight (W) acting on the corresponding structural part, by use of the formula $$W = S_O C_O + S_I C_I + A.$$

4. A method according to claim 3, further comprising the step of obtaining measurement signals and weights under at least two states of loading of the aircraft, the two loading status being as far apart as possible.

5. A method according to claim 4, further comprising the step of employing at least two different torsional states of the loaded aircraft structural part to obtain the measurement signals and weights for at least one loading condition.

6. A method according to claim 5, further comprising the steps of performing a braking of wheels of the aircraft undercarriage while locating at least one wheel on an ascending or descending ramp; and determining a torsion of half axles of a two-wheel undercarriage by braking fast at least one wheel located on the ascending or the descending ramp.

7. A method according to claim 5, further comprising the steps of placing a plate under one of four wheels of said aircraft undercarriage; and determine a torsion of a pivot arm of the four-wheel undercarriage by the placing of the plate under one of the four wheels.

8. A method according to claim 5, further comprising the steps of placing plates under two of four wheels of said aircraft undercarriage, the two wheels being arranged diagonally apart from each other; and determining a torsion of pivot arms of the four-wheel undercarriage by the placing of the plates under the two wheels.

9. A method according to claim 1, wherein the undercarriage is a four-wheel undercarriage, further comprising the steps of obtaining individual measurement signals ($C_O$, $C_I$) of sensors of a pair of sensors;

determining corresponding individual wheel weights ($W_O$, $W_I$); and calculating the weight and torsion portions ($S_W$, $S_T$) of calibration factors ($S_O$, $S_I$) of individual wheels as well as offsets ($A_O$, $A_I$) by use of the following formulas:

$$W_O = \frac{C_O + C_I}{2} \times S_{WO} + \frac{C_O - C_I}{2} \times S_{TO} + A_O$$

$$W_I = \frac{C_O + C_I}{2} \times S_{WI} + \frac{C_I - C_O}{2} \times S_{TI} + A_I.$$

* * * * *